June 7, 1960 H. COANDA 2,939,654
DEVICE FOR THE SIMULTANEOUS CONTROL OF
LIFTING AND DIRECTIONAL ELEMENTS
Filed April 30, 1957 3 Sheets-Sheet 1
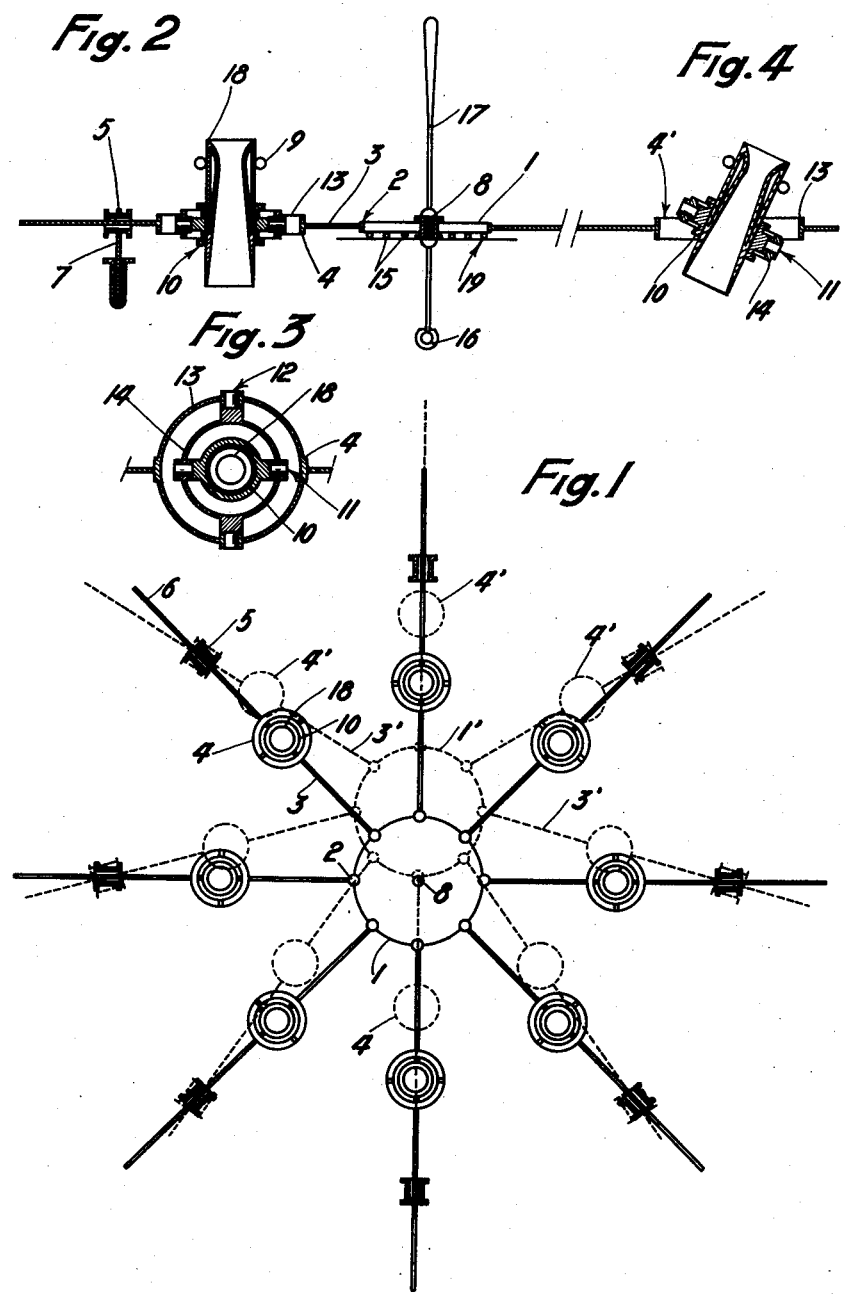

June 7, 1960

H. COANDA 2,939,654

DEVICE FOR THE SIMULTANEOUS CONTROL OF
LIFTING AND DIRECTIONAL ELEMENTS

Filed April 30, 1957

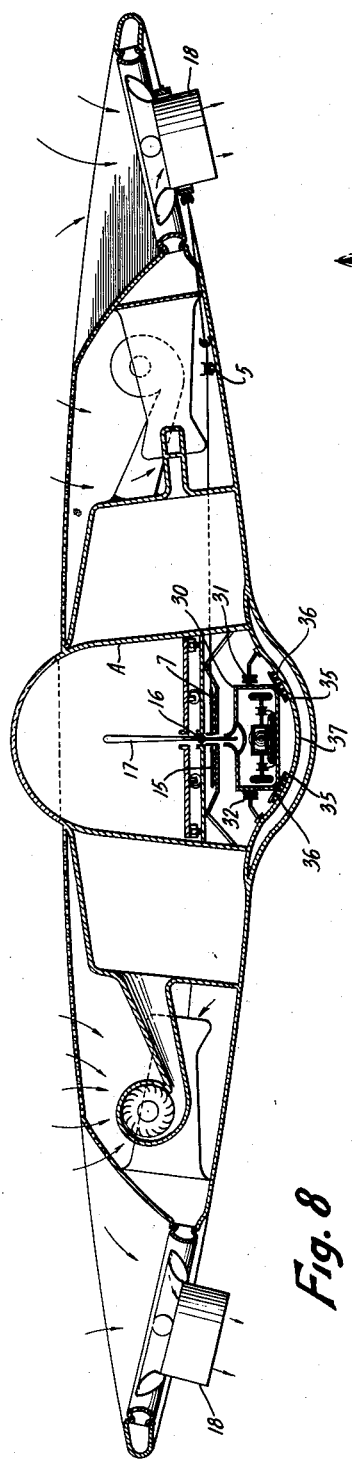
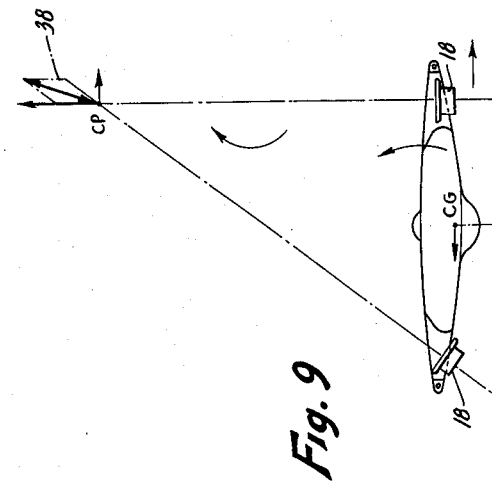
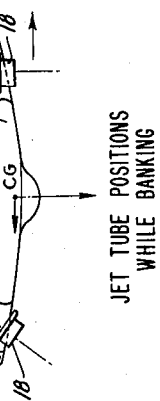

United States Patent Office 2,939,654
Patented June 7, 1960

2,939,654

DEVICE FOR THE SIMULTANEOUS CONTROL OF LIFTING AND DIRECTIONAL ELEMENTS

Henri Coanda, Paris, France, assignor to Sebac Nouvelle S.A., a corporation of Switzerland Filed Apr. 30, 1957, Ser. No. 655,972

Claims priority, application France Sept. 13, 1956

5 Claims. (Cl. 244—79)

In an aircraft which rises vertically (or almost vertically) by virtue of the simultaneous action of a number of elements such as discharge nozzles, rockets or similar elements, it is essential to be able to control constantly the action of these discharge nozzles or rockets and especially the direction and the force of their action, and this for a number of reasons, for example when it is desired to move the aircraft or when one of the discharge nozzles or rockets operates differently from the others, or again when the ambient medium acts in an unusual manner on the aircraft.

In addition, it happens that very rapid shocks are produced, and in this case, the corrections must be instantaneous and in consequence automatic.

It is for these reasons that the present invention has for its object a control device for lifting and directional members which can be operated either at will by the pilot or automatically from a gyroscopic unit.

A control device in accordance with the invention is applied for example to an aircraft provided with a number of discharge nozzles located along the circumference of a circle and in which the reaction directions, orientated upwards, meet each other and cross above the centre of gravity, said discharge nozzles being suspended by a swivel joint of the Cardan type.

The present invention contemplates the provision of a simultaneous control for all these nozzles, giving to each nozzle the corresponding inclination desired.

In accordance with the invention the manual or automatic control device comprises a horizontal central plate having at its periphery a number of points of articulation equal to the number of nozzles to be controlled, crank-arms fixed to the central plate joining each of the nozzles to the articulation points referred to. On these crank-arms, the fixing of the discharge nozzles is effected by joints or pivotal attachments which operate along two axes located in the same plane as the central plate, the joints each comprising at its center a sleeve member through which the nozzle to be controlled is arranged to slide; each crank-arm is extended beyond the corresponding nozzle so as to be supported by a slide situated in the plane of the central plate, each slide being articulated in its turn about a vertical axis; finally, the central plate is actuated by a lever which can pivot about a point arranged below or above the plate, the said lever being connected to the plate by a member of the same type as that which effects the control of each discharge nozzle, that is to say by a member comprising a joint of the Cardan type with a sleeve at its center.

In addition, in order to obtain automatic control, there may be provided a gyroscopic system formed on the one hand by gyroscopes having their axes in the horizontal plane and, on the other hand, by one or a number of gyroscopes placed in such manner that their axes are in a vertical plane, this gyroscopic system forming a supporting and reference trihedron in space for the aircraft.

The gyroscopic system is preferably connected to the aircraft by means of clutches. When the gyroscopic system is completely de-clutched from the whole of the aircraft, it may be coupled either directly or through a servo-mechanism to the handle of the control lever of the central plate, and from that moment the aircraft is controlled automatically by this gyroscopic system.

In accordance with a special feature of the invention, it is also possible to effect the control of the aircraft by the pilot, by coupling the gyroscopic system to the aircraft, or to turn the aircraft over to automatic control by de-clutching the gyroscopic system.

In certain forms of construction, a supplementary gyroscopic system may be provided to replace only the action of the pilot, the gyroscopic system first mentioned remaining fixed to the aircraft.

There will now be described a form of embodiment of the invention given by way of example and without any limiting sense, reference being made to the accompanying diagrammatic drawings, in which:

Fig. 1, is a diagrammatic view in plan of the whole of the control device;

Fig. 2, is an elevation view of the device in Fig. 1;

Fig. 3 is a plan view showing the articulation which controls a discharge nozzle;

Fig. 4, is a diagrammatic view showing the position of a discharge nozzle displaced by the movement given to the central plate;

Fig. 8, is an elevation section of an aircraft illustrating the manner in which a device or system according to the invention is mounted therein;

Figs. 9 and 10, are diagrammatic views of the manner in which the nozzles or jet tubes are positioned according to the invention for banking and take-off respectively.

Figure 5:
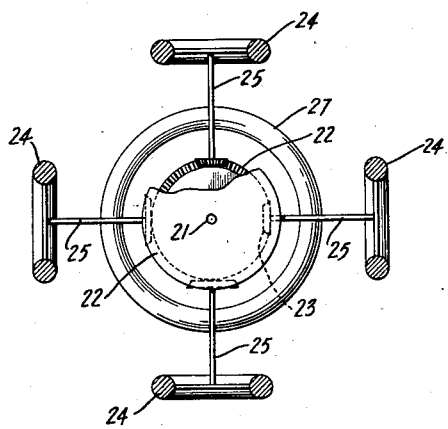
Figs. 5 and 6, are diagrammatic views respectively in plan and in elevation, showing a gyroscopic system suitable for carrying the invention into effect.

Referring first of all to Figs. 1 to 4 inclusive, it is seen that a control device in accordance with the invention is constituted and operates as follows:

A central plate or central control member 1 is capable of taking up a number of positions under the action of a lever 17, of which one position has been shown in solid lines (position 1) and one in broken lines (position 1') in Fig. 1. Crank-arms or connecting rods articulated to the central plate at 2 then occupy the respective positions 3 and 3' (see Fig. 1) by sliding inside slides or guides 5 which are disposed radially of member 1 and can rotate about a vertical axis 7. Universally tiltable support means 4 occupy the positions 4' when the central control member is shifted to 1' (Fig. 1). In Fig. 4, there has been shown the position of the supports at 4'. The supports each comprise a ring 14 fixed to a ring 13 by two rotatable spindles 12 which can be seen on Fig. 3. The ring 14 is coupled to a sleeve 10 by two rotatable spindles 11. A discharge nozzle 18 fixed to a swivel joint 9 is arranged to slide inside the sleeve 10. It will be understood that a plurality of jet tubes or nozzles 18 forming power units of the jet type are arranged angularly spaced radially of member 1 and disposed spaced on the circumference of a circle.

By virtue of this arrangement, when the support 4 is moved to the position 4', which is not necessarily in the plane of symmetry, which is determined by the direction of the shaft 7 and the crank-arm 3, the discharge nozzle 18 can take up an inclined position in a new plane by sliding inside the sleeve 10, the displacement of the control member 1 having taken place due to the action of the lever 17, which is itself fixed to the aircraft by a swivel joint 16 (Fig. 8). This lever is fixed to the member 1 by an articulation 8 which is of the same kind as that which controls the discharge nozzles 18, and which is shown in Fig. 3. Finally, it may be noted that the member 1 slides on balls 15 resting on a surface 19 fixed to the aircraft.

Figure 6:
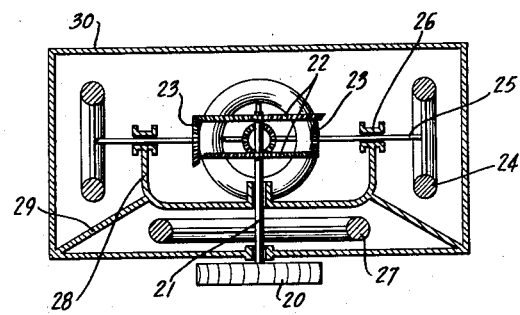

Figs. 5 and 6 show a gyroscopic system which can be associated with advantage with the control device shown in Figs. 1 to 4. This system comprises a turbine 20 (preferably driven by the suction of the surrounding air in the apparatuses which supply the lifting or directional discharge nozzles 18 of Fig. 2) which drives a shaft 21, actuating in its turn a pair of bevel gears 22 which transmit movement to the bevel-gears 23 which drive in turn drive spindles 25 and thus transmit to gyroscopes 24 their movement of rotation. The spindles 25 rotate in bearings 26 which transmit the gyroscopic effect of the spindles 25, through the intermediary of a support 28, 29, to the whole assembly or frame 30.

In addition, on the shaft 21 is mounted a gyroscope 27, which has the effect of keeping the whole of the gyroscopic system vertical.

Figure 7:
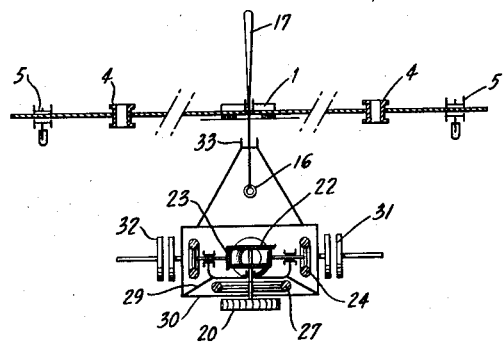
Fig. 7 is a diagrammatic view showing the assembly of the control device shown in Figs. 1 to 4 with the gyroscopic system of Figs. 5 and 6.

In Fig. 7, there has been shown an assembly of the gyroscopic system of Figs. 5 and 6 which provides for its action on the lever of the control device of Figs. 1 to 4. A set of clutches 31 and 32 couples this gyroscopic system to the aircraft. When this clutch system is released from the aircraft, it is engaged at 33 to the control lever 17 of the member 1, and in consequence, the aircraft is free to move; but the actions due to the movements which the aircraft would tend to create with respect to the central members 1 are instantaneously opposed by the control of the discharge nozzle effected (by the control device in accordance with the invention) in the opposite sense, and the corrections are automatic.

There is thus obtained an automatic control which maintains the aircraft in the position which it has previously been given.

Devices according to the present invention are particularly suitable for the control of aircraft of the type described and claimed in my co-pending application, Serial No. 626,026 filed of even date.

As shown in Fig. 8, in which the devices of the invention have been given the same reference numbers as in the preceding figures and is shown mounted in cabin A, the movement of a housing 30 for the gyroscopic device 22–25 causes the lower part of the control stick 17 to pivot about its fixed articulation 16, which causes a sliding movement of the central plate 1 mounted on balls 15. The gyroscope housing 30 can move in a pendular manner about the same pivotal point 16, the casing being supported on plates 35 rolling on balls 36 on a spherical surface 34 of the aircraft, the center of which is the center of gravity of the aircraft. Fig. 8 also shows the arrangement for transmission of movement of the central plate 1 to control the tilt of the discharge nozzles 18.

As can be seen diagrammatically in Fig. 9, the nozzles 18 are tilted in unison to bank the aircraft and a projection of the nozzle center lines corresponding to their effective lines of force intersect at CP with a resultant vector 38 corresponding to the resultant force vector making it possible to bank and thus turn. The position of the nozzles or jet tubes 18 for take-off is shown in Fig. 10. The resultant force is diagrammatically represented as a vector 39 shown as a vertical lift vector directly above the aircraft center of gravity C.G.

It will be understood that various modifications or improvements may be made to the forms of embodiment described and shown, by replacing equivalent members, without thereby departing from the spirit or from the scope of the appended claims.

What I claim is:

1. In an aircraft, a plurality of jet tubes forming power units of the jet type angularly spaced on the circumference of a circle, a source of jet power for the tubes, universally tiltable support means for tiltably supporting the jet tubes individually, a control arrangement for tilting the jet tubes simultaneously with respect to the vertical and to return them to a predetermined position with the jets discharging downwardly comprising, a central control member shiftable a predetermined extent in any direction, a plurality of angularly spaced connecting rods extending radially from the central member and each pivotally connected thereto, each rod being connected to a corresponding jet tube support for moving it to tilt an associated jet tube, for each rod a pivotally mounted guide, the guides being disposed radially of the central control member in fixed angularly spaced positions, and means for shifting the central control member in any direction within the predetermined extent.

2. In an aircraft, a plurality of jet tubes forming power units of the jet type angularly spaced on the circumference of a circle, a source of jet power for the tubes, universally tiltable support means for tiltably supporting the jet tubes individually, a control arrangement for tilting the jet tubes simultaneously with respect to the vertical and to return them to a predetermined position with the jets discharging downwardly comprising, a central control member shiftable a predetermined extent in any direction, a plurality of angularly spaced connecting rods extending radially from the central member and each pivotally connected thereto, each rod being connected to a corresponding jet tube support for moving it to tilt an associated jet tube, for each rod a pivotally mounted guide, the guides being disposed radially of the central control member in fixed angularly spaced positions, and manual means for shifting the central control member at will in any direction within the predetermined extent.

3. In an aircraft, a plurality of jet tubes forming power units of the jet type angularly spaced on the circumference of a circle, a source of jet power for the tubes, universally tiltable support means for tiltably supporting the jet tubes individually, a control arrangement for tilting the jet tubes simultaneously with respect to the vertical and to return them to a predetermined position with the jets discharging downwardly comprising, a central control member shiftable a predetermined extent in any direction, a plurality of angularly spaced connecting rods extending radially from the central member and each pivotally connected thereto, each rod being connected to a corresponding jet tube support for moving it to tilt an associated jet tube, for each rod a pivotally mounted guide, the guides being disposed radially of central control member in fixed angularly spaced positions, and means comprising a lever manually operable by a pilot for shifting the central control member in any direction within the predetermined extent.

4. In an aircraft, a plurality of jet tubes forming power units of the jet type angularly spaced on the circumference of a circle, a source of jet power for the tubes, universally tiltable support means for tiltably supporting the jet tubes individually, a control arrangement for tilting the jet tubes simultaneously with respect to the vertical and to return them to a predetermined position with the jets discharging downwardly comprising, a central control member shiftable a predetermined extent in any direction, a plurality of angularly spaced connecting rods extending radially from the central member and each pivotally connected thereto, each rod being connected to a corresponding jet tube support for moving it to tilt an associated jet tube, for each rod a pivotally mounted guide for slidably guiding the rods the guides being disposed radially of the central control member and radially outwardly of the jet tubes in fixed angularly spaced positions, and means for shifting the central control member in any direction within the predetermined extent.

5. In an aircraft, a plurality of jet tubes forming power units of the jet type angularly spaced on the circumference of a circle, a source of jet power for the tubes, universally tiltable support means for tiltably supporting the jet tubes individually, a control arrangement for tilting the jet tubes simultaneously with respect to the vertical and to return them to a predetermined position with the jets discharging downwardly comprising, a central control member shiftable a predetermined extent in any direction, a plurality of angularly spaced connecting rods extending radially from the central member and each pivotally connected thereto, each rod being connected to a corresponding jet tube support for moving it to tilt an associated jet tube, for each rod a pivotally mounted guide, the guides being disposed radially of the central control member in fixed angularly spaced positions, and gyroscopically controlled means for automatically shifting the central control member in any direction within the predetermined extent for maintaining a preset attitude of the aircraft.

References Cited in the file of this patent

UNITED STATES PATENTS

| | | |
|---|---|---|
| 1,651,845 | Sperry | Dec. 6, 1927 |
| 1,923,290 | Wood | Aug. 22, 1933 |
| 2,499,401 | Madden | Mar. 7, 1950 |

FOREIGN PATENTS

| | | |
|---|---|---|
| 12,288 | Great Britain | May 19, 1914 |
| 1,040,930 | France | May 27, 1953 |
| 1,122,161 | France | May 14, 1956 |